United States Patent [19] [11] 3,717,249
Faley [45] Feb. 20, 1973

[54] SORTER AND STACKER FOR VENEER SHEET AND STRIP MATERIAL

[75] Inventor: Arnold F. Faley, Washougal, Wash.
[73] Assignee: Moore Dry Kiln Company of Oregon, North Portland, Oreg.
[22] Filed: Feb. 22, 1971
[21] Appl. No.: 117,430

[52] U.S. Cl. ...................209/75, 209/82, 214/6 DS, 271/74, 271/88
[51] Int. Cl. ................................................B07c 1/14
[58] Field of Search ........271/64, 74, 88; 209/82, 75; 214/6 S, 6 H, 6 DS

[56] References Cited

UNITED STATES PATENTS

| | | | |
|---|---|---|---|
| 3,227,275 | 1/1966 | Cody | 271/74 X |
| 3,279,792 | 10/1966 | Kostal | 271/88 X |
| 3,334,895 | 8/1967 | Daniels | 271/88 X |
| 3,430,951 | 3/1969 | Hulka | 271/64 |
| 3,477,323 | 11/1969 | Osborn | 271/74 X |

*Primary Examiner*—Richard A. Schacher
*Attorney*—Daniel P. Chernoff and Jacob E. Vilhauer, Jr.

[57] ABSTRACT

A veneer sorting and stacking apparatus for segregating randomly sized veneer sheets, including both relatively wide sheets of selected predetermined dimensions as well as narrower width strips of variable dimension, into a plurality of stacks of respectively uniform characteristics. A main conveyor system delivers transversely arranged unsegregated veneer sheets of random and variable sheet widths horizontally at spaced intervals to the top of the proper respective sorting bin where a diverter roller triggered by width and moisture detecting devices along the path of the conveyor diverts each sheet downwardly into the sheet positioning apparatus of the bin. The sheet positioning apparatus comprises a vacuum conveyor system which retains each sheet by its upper surface and transports it downwardly on an inclined path towards the stack supporting surface of a lift table until a kicker arm separates the respective sheet from the vacuum conveyor, allowing the leading edge of the sheet to drop into abutment with a fixed transverse aligning stop and settle horizontally onto the top of the stack in formation. An aligning clamp immediately seizes the leading edge of the sheet to prevent it from bouncing off of the aligning stop, and thereafter is released prior to the placement of the next succeeding sheet. As the stack reaches a predetermined height with respect to the face of the aligning stop, the lift moves downward in measured increments until a completed stack of predetermined height or count is reached, whereupon the stack may then be removed from its bin by powered rolls or other transporting means. In those of the bins which are intended for stacking variable-sized and generally narrow width veneer strips the vacuum conveyor system for these bins comprises two separate vacuum conveyors, one inclined downwardly from the top center of the bin toward a front aligning stop adjacent the leading transverse edge of the stack and the other inclined in opposite relation toward a rear aligning stop adjacent the rear transverse edge of the stack. Means are provided for alternating the transfer of successive strips from the main conveyor to one or the other of the two vacuum conveyors so as to enable the formation of a uniform stack substantially wider than that of the largest width of veneer strip sorted into the bind. The vacuum conveyor systems handling strip material are also provided with actuable diverter arms at the top center of the bins to divert veneer strips of especially narrow width into the center of the stack.

33 Claims, 15 Drawing Figures

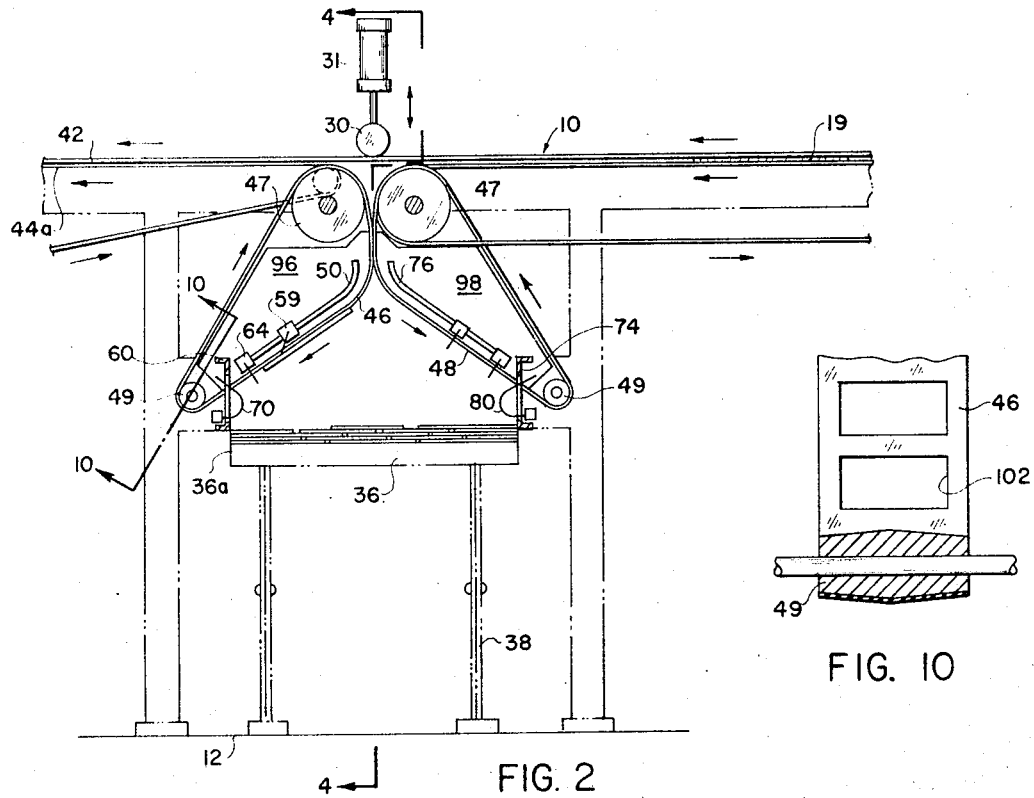
FIG. 2
FIG. 10
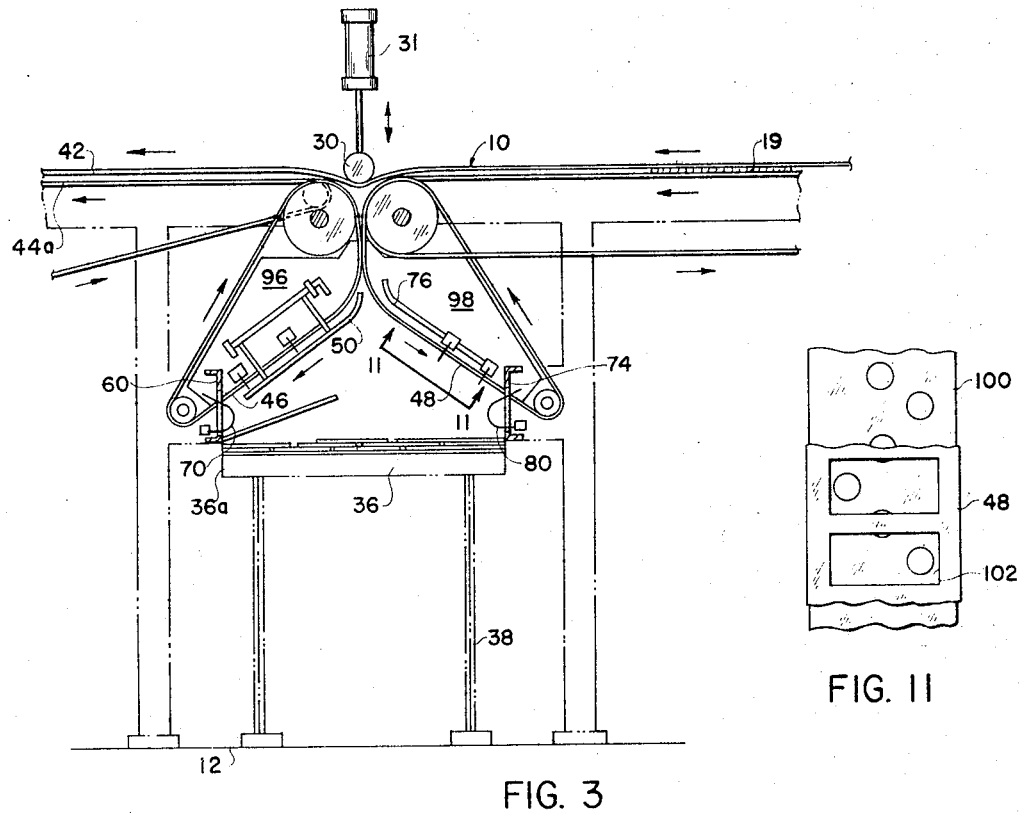
FIG. 3
FIG. 11

SORTER AND STACKER FOR VENEER SHEET AND STRIP MATERIAL

BACKGROUND OF THE INVENTION

This invention relates to improvements in veneer sorting and stacking apparatus of the type which segregates variable width veneer sheets into a plurality of stacks of respectively uniform characteristics having smoothly aligned edges for ease in further handling. More specifically the veneer sorter and stacker of the present invention is particularly adaptable for segregating and stacking both relatively large sheets of selected predetermined widths as well as random-sized narrow width strips of veneer. With the present invention veneer strip material is formed evenly and uniformly into a stack having a substantially greater width dimension than any of the veneer strips of which it is composed. For purposes of this disclosure "width" denotes the dimension of a veneer sheet, strip or stack which is perpendicular to the grain of the veneer.

Veneer sorters and stackers of the type known to art, as shown for example in Stickney U.S. Pat. No. 3,508,648, have generally been capable of forming reasonably aligned and uniform stacks only where the respective stacks are composed of veneer sheets having a predetermined standard or nominal width, for example half sheets of 27 inch width or full sheets of 54 inch width. Veneer clippers are programmed to provide these desired standard widths, but imperfections such as splits, knotholes and other irregularities in the logs from which the veneer sheets are peeled by the veneer lathe causes a great amount of strip material to be produced in various odd sizes of generally narrower width than the minimum standard sheet size, sometimes resulting in strips no more than a few inches wide.

Since these variable width veneer strips represent a substantial amount of valuable wood product they are not discarded but instead are typically used to form the core layer or layers of a plywood panel. For ease and convenience of handling it is desirable that this strip material be formed into a uniform stack having substantially greater width than any of the strips which compose the stack, and having evenly aligned edges. In the past, in order to achieve the formation of such a stack required hand labor which was time consuming and costly. Some machines were developed to handle such stacking, as for example the stacking device shown in Herman U.S. Pat. No. 3,545,744. However these devices have not provided even alignment of the transverse edges of the stack, nor have they produced stacks of substantially uniform composition due to the curling, folding or skewing of strips which occurred with such prior art devices as the strip material was dropped onto the stack information.

SUMMARY OF THE PRESENT INVENTION

The present invention is directed to a veneer sorter and stacker of the general type described in which a main conveyor horizontally transporting transversely arranged veneer sheets at spaced intervals is provided with width and moisture detecting devices which trigger diverter rollers located above each of a plurality of sorter bins for diverting veneer sheets of like standard width and moisture content into respective bins. Other bins and diverters are provided for collecting and stacking various odd sizes of veneer strip material having widths narrower than the standard sheet widths.

All the bins are provided with sheet positioning apparatus for receiving the diverted sheet or strip material from the main conveyor and comprising a vacuum conveyor system which retains each sheet by its upper surface and transports it along a downwardly inclined path from the top of the bin toward the stack supporting surface of a lift table until a kicker arm separates the respective sheet from the vacuum conveyor, allowing the leading edge of the sheet to drop into abutment with a fixed transverse aligning stop and settle horizontally onto the top of the stack in formation. Those bins which are to be used for stacking the variable-sized narrow width veneer strip material are equipped with two separate vacuum conveyors, one inclined downwardly at an angle from the top center of the bin toward a front transverse aligning stop and the other inclined in diverging direction downwardly toward a rear transverse aligning stop. The two vacuum conveyors are each provided with means for creating a greater vacuum at their point of divergence from one another than at their lower inclined portions where separation of the strip from the conveyor occurs. As the leading edge of a respective veneer sheet drops into abutment with an aligning stop, a clamp immediately seizes the leading edge of the sheet to prevent it from bouncing off of the aligning stop, and thereafter is released prior to the placement of the next succeeding sheet against the stop. As the stack grows in height the lift moves downward in measured increments.

Referring specifically to those bins designed for handling the random-sized narrower width veneer, hereinafter referred to as strip bins, they are positioned in advance of those bins for stacking standard width veneer sheets of the same moisture content range, and the diverter rollers of these strip bins are constructed so as to be in a normally diverting position while the diverters for the bins receiving the veneer sheets of standard width, hereinafter referred to as sheet bins, are arranged in a normally non-diverting position. A width measuring device such as a photoelectric pulse generator located along the path of the main conveyor in advance of the bins senses the width of each piece of veneer as it passes toward the bins. If the width is narrower than the standard sheet sizes (e.g., 54 inch or 27 inch), the diverter directs the narrow width strip downwardly between the two inclined vacuum conveyors of the strip bin. Vacuum shifting means are provided for alternating the transfer of strip pieces between the two vacuum conveyors so that one vacuum conveyor or the other attracts the veneer strip from the main conveyor and directs it downwardly into abutment with either the forward or the rear transverse aligning stop, as the case may be, and deposits it on the top of the stack in formation in that bin. As soon as the strips stacked against such aligning stop reach a predetermined height with respect to the face of the stop, a limit switch or other sensing device is triggered which shifts over the vacuum action from the one vacuum conveyor to the other so that strips thereafter entering the top of the strip bin are then directed in like fashion to the other aligning stop where they are deposited on the stack until a predetermined height is reached. At this point the lift supporting the stack moves downward a measured increment and the vacuum action is shifted back to the first vacuum conveyor, and so on until a completed stack of strip is formed in that particular bin.

If the width sensing device on the main conveyor senses an especially narrow width strip, it triggers a set of diverter arms, located at the top center of the strip bin between the two vacuum conveyors, which prevents the strip from transferring over to either of the two vacuum conveyors and instead simply causes it to drop directly downward on the center of the stack. A photoelectric sensor monitoring the height of the center of the stack detects if a greater than proportionate share of strips has been dropped into the center of the stack, causing the stack to develop a crown in the middle. If too great a crown develops then the photoelectric sensing device inhibits the action of the center diverter arms and allows the strips to be carried by the respective vacuum conveyors of the strip bin until the crown is reduced to within acceptable limits.

The stack supporting surface of the respective lift tables used in the various sheet and strip bins has a convex cross-section so that it is higher along its longitudinal centerline (i.e., the line perpendicular to the grain of the veneer material forming the stack) than at its longitudinal outer edges, causing veneer sheets or strips stacked thereon to curve downwardly along their transverse length, thus suppressing their natural tendency to curl upward at their transverse edges.

The novel features of the veneer sorter and stacker of the present invention provide it with several important operational advantages over devices found in the prior art. First, the provision of vacuum conveyor means in each bin inclined angularly downward toward a transverse edge aligning stop, combined with the aligning clamp for retaining the edge of the sheet or strip material so that it does not bounce back from the stop, results in excellent positive edge control. This ensures that the transverse edges of the stack formed will be smooth and even, greatly enhancing the speed and convenience of its handling, and minizing damage of the stack in further handling and processing.

Second, in stacking short width veneer strips, the provision in the present device for feeding random-width strips from the top center of the strip bin to both the front and rear transverse edges of the bin by means of a pair of downwardly inclined symmetrically diverging vacuum conveyors ensures that both transverse edges of the stack will be uniformly smooth and even. Moreover the provision of means for creating a relatively strong vacuum at the point of divergence of the two conveyors as opposed to a lesser vacuum at the points where strips are separated from the respective conveyors ensures that the strips will initially be attracted to the correct conveyor rather than falling off into the bin, and will separate easily from the conveyors when intended.

Third, the provision of positioning means in the strip bins for directing the wider strips to the edges of the stack and the narrower ones to the center of the stack improves the uniformity of the stack by minimizing the folding and curling tendency of the wider strips and the skewing tendency of the narrower ones.

Fourth, the automatic level sensing devices at both the front and rear transverse edges of the strip bin, coupled with the alternating of the vacuum action between the two vacuum conveyors, further assure uniform and even build-up of the stack. This advantage is further enhanced by the provision of sensing means for detecting any transverse crowning of the stack at its center, and the provision of means for preventing any strips from being directed to the center of the stack until the crown is reduced to within acceptable limits.

Fifth, the novel diverter means comprising downwardly reciprocating rollers located above successive gaps in the main conveyor bottom belts for diverting veneer pieces downwardly into the respective bins provides faster sorting with less need for precise synchronization between diverter actuation and veneer piece location than has heretofore been obtainable with other sorter systems.

Sixth, the provision of positioning the strip bin in advance of the sheet bins for veneer material of the same desired range of moisture content, coupled with the provision of a normally actuated diverter means offbearing from the main conveyor the far more numerous strip material, allows faster and smoother sorting and stacking by eliminating any problem occasioned by the reaction response time of the strip diverter.

Seventh, the provision of a stack supporting surface of convex configuration along the grain of the veneer material forming the stack suppresses the tendency of the veneer to curl or cup and enhances the formation of a stack of uniform consistency.

It is therefore a principal object of the present invention to provide a new and improved veneer sorter and stacker which quickly and efficiently sorts variable-sized veneer pieces to form stacks of uniform composition having smoothly and evenly aligned transverse edges for ease and convenience in further handling, regardless of whether said stacks are composed of standard uniform width veneer sheets or of odd sized, variable and generally narrower width veneer strips.

It is a further object of the invention to provide means for forming random-sized narrow width veneer strips into stacks of substantially greater width than the individual strips and to build up such stacks evenly and with positive edge control on both front and rear transverse edges of the stack to provide uniform consistency and smooth transverse edges for ease and convenience in further handling.

It is a still further object of the present invention to provide a new and improved veneer sorter and stacker capable of faster and more efficient transfer and sorting of veneer sheets by their respective width and moisture characteristics with less need for precise synchronization than has heretofore been obtainable with prior art devices.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 2 is a side elevational view of a strip veneer stacking bin with the kicker arms, aligning stops, and sensing switches added.

FIG. 3 is a side elevational view of a strip veneer stacking bin with its diverter roller in actuated position and showing one kicker arm extended to separate a veneer strip from the vacuum conveyor.

FIG. 10 is an enlarged detail sectional view of a vacuum conveyor belt and roller assembly taken along line 10—10 of FIG. 2.

FIG. 11 is an enlarged detail view of the sheet carrying surface of a vacuum conveyor taken along line 11—11 of FIG. 3.

DESCRIPTION OF THE PREFERRED EMBODIMENT

Figure 1:
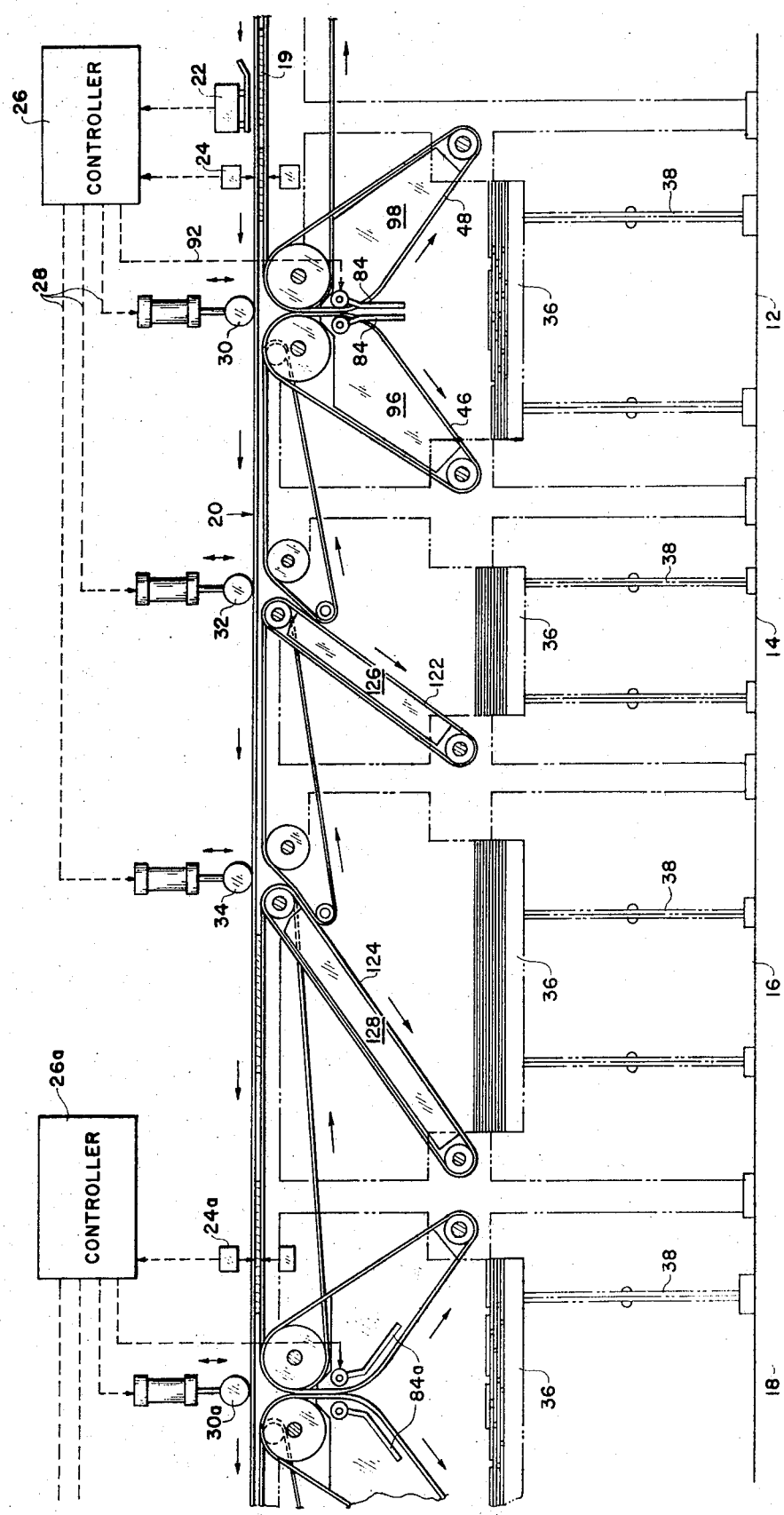
FIG. 1 is a side elevational view, partially schematic and somewhat simplified, showing an illustrative embodiment of the veneer sorter and stacker of the present invention having one strip and two standard width sheet stacking bins, all for stacking veneer pieces of a predetermined moisture content range, followed by the first of an additional set of three bins for stacking veneer pieces of a different moisture content range, with the respective diverter rollers of each bin being shown in the non-actuated position.

Referring to the drawings, particularly FIG. 1 initially, the veneer sorter and stacker apparatus comprises a framework designated generally as 10 defining a plurality of bins 12, 14 and 16 and 18 respectively for receiving and stacking pieces of veneer comprised of standard-width sheets and random-sized narrower width strips. Bin 18 is the first in a second series of three bins, the last two of which are not shown, which is identical to the set formed by bins 12, 14 and 16 respectively. It is possible that a third or even fourth successive set of identical bins might be added, depending on the number of sorting gradations desired.

A main conveyor designated generally as 20 runs along the top of framework 10 carrying transversely arranged sheets and strips of veneer 19 widthwise (i.e., perpendicular to the grain direction) from the discharge end of either a veneer dryer or the green chain of a veneer production line. The direction of travel of conveyor 20 is right to left in FIG. 1.

Located along the path of main conveyor 20 in advance of the first bin is a moisture detector 22 and a veneer width sensor 24 for measuring the moisture and width characteristics respectively of the oncoming veneer pieces to identify those having like characteristics. The moisture and width sensing devices, acting through controller 26 and appropriate memory logic circuitry 28, control vertically reciprocating diverter rollers 30, 32 and 34.

Width sensor 24 may exemplarily comprise a photoelectric rotopulser known to the art which measures the width of passing veneer pieces by counting the number of intermittent light pulses which are blocked from transmission between the top and bottom of main conveyor 20 during the passage of a veneer piece. Other types of width sensors known to the art might also be utilized for this purpose.

Moisture detector 22 is preferably a continuous check moisture detector of the type for example similar to a Laucks Sentry moisture detector manufactured by Laucks Laboratories, Inc. and described in their Bulletin No. B17-57(5M).

Bins 12, 14 and 16 are each intended to accept veneer pieces of different respective widths, but the moisture content range of the pieces diverted into the three bins is intended to be the same. Therefore, if moisture detector 22 senses a veneer sheet or strip having moisture content outside of the desired range for the three bins, the controller 26 actuates strip diverter roller 30 into its retracted non-diverting position and retains roller 32 and 34 in their already retracted positions, as shown in FIG. 1, when that particular veneer piece passes beneath the respective diverter rollers. Thus the piece will not be diverted into any of the aforementioned three bins but will instead pass onto the next set of bins beginning with bin 18 which is intended for veneer having a different range of moisture content. Thus in this manner the aforedescribed arrangement of bin sets will enable the segregation of veneer having two disparate moisture content ranges, such as the segregation of heartwood from sapwood.

If the oncoming veneer piece is within the moisture range intended for the first three bins, moisture detector 22 will not exercise control over any of diverter rollers 30, 32 and 34, and instead their operation will be controlled in response to the width sensor 24 so as to cause their stacking among the bins of the first set according to veneer size.

If the piece of veneer approaching the set of three bins 12, 14 and 16 has a width narrower than the standard sheet widths intended for collection in sheet bins 14 and 16, width sensor 24 allows diverter roller 30 to remain in its normally downwardly extended diverting position. The narrow width veneer strip will thus be diverted downwardly into strip bin 12 where it is deposited by means hereinafter explained onto a board supporting surface for forming a stack having a width dimension substantially greater than the narrow width veneer strips.

If the oncoming veneer piece possesses the correct moisture content for the first three bins but is of standard sheet width such as 27 inches or 54 inches, and thus greater than that of the narrow width strips, width sensor 24 acting through controller 26 causes diverter roller 30 to retract and allow the sheet to pass toward diverter rollers 32 and 34 which normally are both retained in retracted or don-diverting positions. Depending upon the width of the sheet as monitored by the sensor 24, the proper diverter is actuated downwardly to direct the sheet into the proper bin. (It will be understood that more than three bins could be included in the first bin set if it were desired to segregate more than two standard widths of sheets.)

If the tolerance limits set into moisture detector 22 prevent a veneer piece from entering any of the first set of bins because its moisture content is not within the prescribed range, as described above, the piece progresses on the main conveyor 20 toward the next set of bins beginning with bin 18. A second width sensor 24a is located along the path of the main conveyor in advance of bin 18 and, acting through a second controller 26a, performs the same function with respect to a second set of diverter rollers beginning with 30a as width sensor 24 performs with respect to its first set of diverter rollers 30, 32 and 34. (It will be understood, of course, that in lieu of a second width sensor 24a associated with the second set of bins, the single width sensor 24, in conjunction with suitable memory logic and controller circuitry, could control the operation of a plurality of bin sets.)

Figure 4:
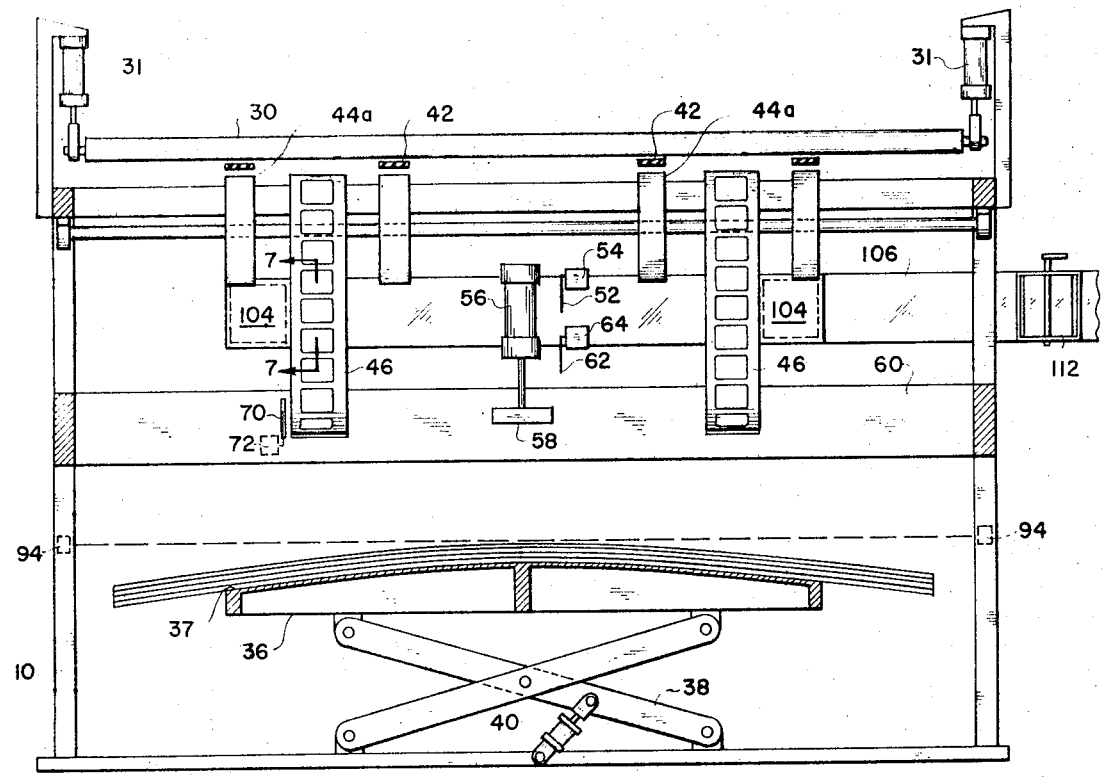
FIG. 4 is an end sectional view of a strip stacking bin taken along line 4—4 of FIG. 2.

Turning now to the construction of the bins themselves, they each comprise a stack support table 36 mounted on a scissors lift 38 which is of conventional design and actuated for vertical movement by pneumatic cylinder 40, as seen in FIG. 4. The upper plate surface 37 of stack support table 36, when viewed longitudinally along a line parallel to the direction of travel of main conveyor 20, is higher along its longitudinal centerline than at its longitudinal outer edges. This surface configuration causes the veneer sheets or strips which are stacked transversely to such longitudinal centerline to curve downwardly along their transverse length, thus suppressing their tendency to curl.

Looking now specifically at strip bin 12, main conveyor 20, comprising as shown in FIG. 4 parallel spaced sets of top belts 42 and bottom belts 44 and 44a, transports the transversely arranged veneer pieces 19 toward the top of strip bin 12 where, if the piece is of less than standard sheet width and of proper moisture content, diverter roller 30, which is normally held in a downward diverting position by pneumatic cylinders 31, diverts the leading edge of the strip downwardly as shown in FIG. 3 between forward vacuum conveyor 46 and rear vacuum conveyor 48. Through apparatus to be described later herein, only one of the two vacuum conveyors is experiencing high vacuum action thereon at any given time. Assuming that a stack is just beginning to form on stack support table 36 and that forward vacuum conveyor 46 is the one experiencing high vacuum action at the time, the diverted veneer strip will be held, by suction applied to its upper surface, against the surface of vacuum conveyor 46 and directed downwardly at an incline from the top center of the bin toward the forward edge 36a of stack support table 36.

Figure 6:
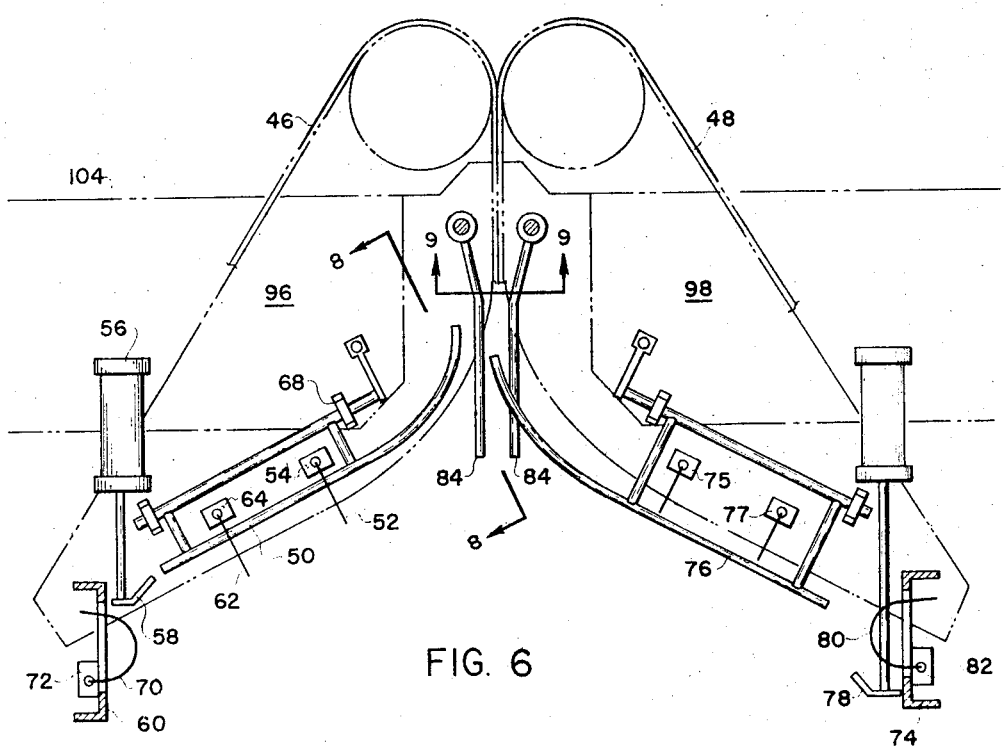
FIG. 6 is an enlarged side elevation view, partially sectional, of the kicker arms, diverter arms, aligning clamps and aligning stops of a strip stacking bin, showing their relation to each other and their relation to the vacuum conveyors, with other parts removed for clarity.

As the sheet progresses downwardly its leading edge contacts spring-biased whisker 52 of limit switch 54, as best seen in FIG. 6, which triggers pneumatic cylinder 56 to retract aligning clamp 58. Aligning clamp 58 is positioned midway along the transverse face of forward aligning stop 60 which defines the forward transverse edge of the bin and is vertically aligned with the forward edge 36a of stack support table 36.

Figure 8:
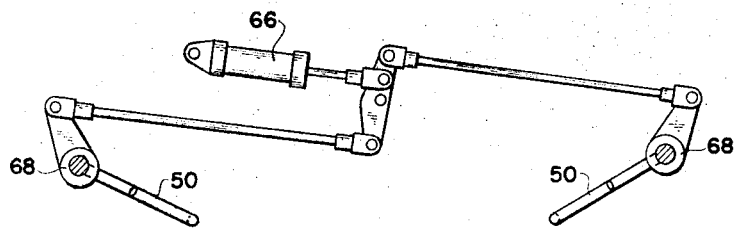
FIG. 8 is a detail view of the actuating mechanism for the kicker arms taken along line 8—8 of FIG. 6.

As the veneer strip continues its travel downwardly along vacuum conveyor 46 its leading edge next contacts spring-biased whisker 62 of limit switch 64, which retracts pneumatic cylinder 66 (FIG. 8) pivoting forward kicker arms 50 downwardly about their pivotal mountings 68, thereby pushing the veneer strip downwardly away from the face of forward vacuum conveyor 46.

The piece then falls downwardly into leading edge abutment with forward aligning stop 60 and settles onto stack support table 36. Upon the veneer piece being separated from vacuum conveyor 46 by kicker arms 50, whisker 52 of limit switch 54 springs back to its original biased position which triggers pneumatic cylinder 56 to extend aligning clamp 58 into contact with the top of the veneer piece to keep it from bouncing back from aligning stop 60. As the veneer piece is separated from the conveyor, whisker 62 also springs back to its original biased position which returns kicker arm 50 to its retracted non-actuated position.

It should be understood that operation of the various pneumatic cylinder actuators of the present invention may be accomplished through pneumatic solenoid valves of conventional type connected to a source of air pressure and triggered by electric current.

Succeeding veneer strips follow the same pattern as the one just described, and they stack one on top of the other against forward aligning stop 60 until spring-biased whisker 70 of limit switch 72 senses that the stack of strips against the forward aligning stop has reached a predetermined height. Thereupon switch 72 activates a vacuum valve hereinafter described which shifts over the vacuum action from the forward vacuum conveyor 46 to the rear vacuum conveyor 48. Thus narrow width veneer sheets entering the top of bin 12 are now attracted by suction to conveyor 48 which directs them downwardly and rearwardly at an angle toward rear aligning stop 74.

Rear conveyor 48 and its associated limit switches 75 and 77, kicker arms 76, aligning clamp 78 and aligning stop 74 are symmetrically identical to forward conveyor 46 and its related equipment, and precisely the same sequence of events occurs with respect to the operation of rear kicker arms 76 and rear aligning clamp 78 as was previously described for the corresponding components associated with the forward vacuum conveyor 46. When whisker 80 of limit switch 82 senses that the sheets being stacked against rear aligning stop 74 have reached a predetermined height, limit switch 82 triggers scissors lift pneumatic cylinder 40 which retracts the lift and lowers the stack a measured increment. At this point limit switch 82 also causes the vacuum action to shift back to the forward vacuum conveyor 46 so that succeeding veneer strips once more will be directed to stack against forward aligning stop 60.

Figure 9:
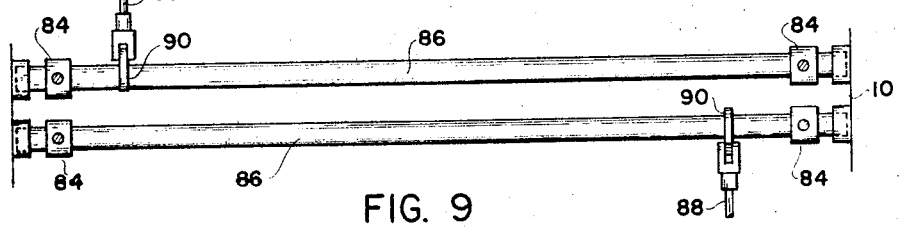
FIG. 9 is a detail view of the actuating mechanism for the diverter arms taken along line 9—9 of FIG. 6.

As seen in FIGS. 6 and 9, strip bin 12 is also preferably equipped with center diverter arms 84 pivotally mounted on framework 10 and operated by actuators 88 acting through levers 90 on pivot rods 86. Diverter arms 84 are normally retracted to the positions shown for diverter arms 84a of the strip bin 18 in FIG. 1. However, when width sensor 24 detects an especially narrow piece of veneer strip approaching the strip bin 12, the controller 26 triggers diverter arms 84 through circuitry 92 and actuators 88, pivoting the arms toward each other to the central position shown in FIG. 6 and in bin 12 of FIG. 1. Regardless of which of the vacuum conveyors 46, 48 is under vacuum action at the time, diverter arms 84 prevent the strip from following the inclined path of either conveyor and instead guide it from the conveyor into a central position from which it drops onto the middle of the stack.

A photoelectric sensor device 94, as seen in FIG. 4, is arranged to scan transversely across the stack so that, if a greater than proportional number of narrow strips are diverted into the center of the stack by diverter arms 84 so as to cause the stack to develop an excessive crown, this is detected by the interruption of the sensor beam and a switch is tripped in controller 26 which inhibits the further actuation of diverter arms 84 until the crown is reduced to within acceptable limits.

Alignment of the longitudinal edges of the stack (that is, the edges perpendicular to the grain) may be obtained by any number of conventional means. Preferably ending conveyors or rollers (not shown) positioned on either side of main conveyor 20 align the transverse ends of each veneer piece prior to its being diverted into the respective bin.

Turning now to the particulars of the vacuum conveyor system of bin 12, it comprises, as previously mentioned, a forward vacuum conveyor 46 and a rear vacuum conveyor 48. Referring to FIG. 3, each vacuum conveyor has two endless, transversely spaced, apertured belts carried on drive rollers 47 and idler rollers 49 with their respective axes of rotation arranged perpendicular to the direction of travel of main conveyor 20. The drive and idler rollers respectively have convex surfaces, as depicted with respect to idler roller 49 in FIG. 10, in order to keep the perforated belts from sliding off of the rollers.

As shown in FIG. 3, the veneer carrying surfaces of conveyors 46 and 48 face each other at the top center of bin 12 and then divergingly curve away from one another at an incline downwardly toward the forward aligning stop 60 and rear aligning stop 74, respectively. A pair of forward vacuum chambers 96 and a pair of rear vacuum chambers 98 are located within the inner space defined by the perforated belts of vacuum conveyors 46 and 48 respectively. Each of the aforementioned vacuum chambers has a perforated surface 100, shown in FIG. 11, which contacts the inside surface of each perforated belt beginning at a point where the carrying surfaces of the forward and rear conveyor belts face each other at the top center of the bin 12 and continuing downwardly along a substantial portion of the travel path of each of the respective belts. When one of the vacuum chambers is under high negative air pressure, its associated belt attracts the individual veneer strips to its surface by the application of suction from the perforated surface 100 of the vacuum chamber through the belt's rectangular apertures 102.

Figure 5:
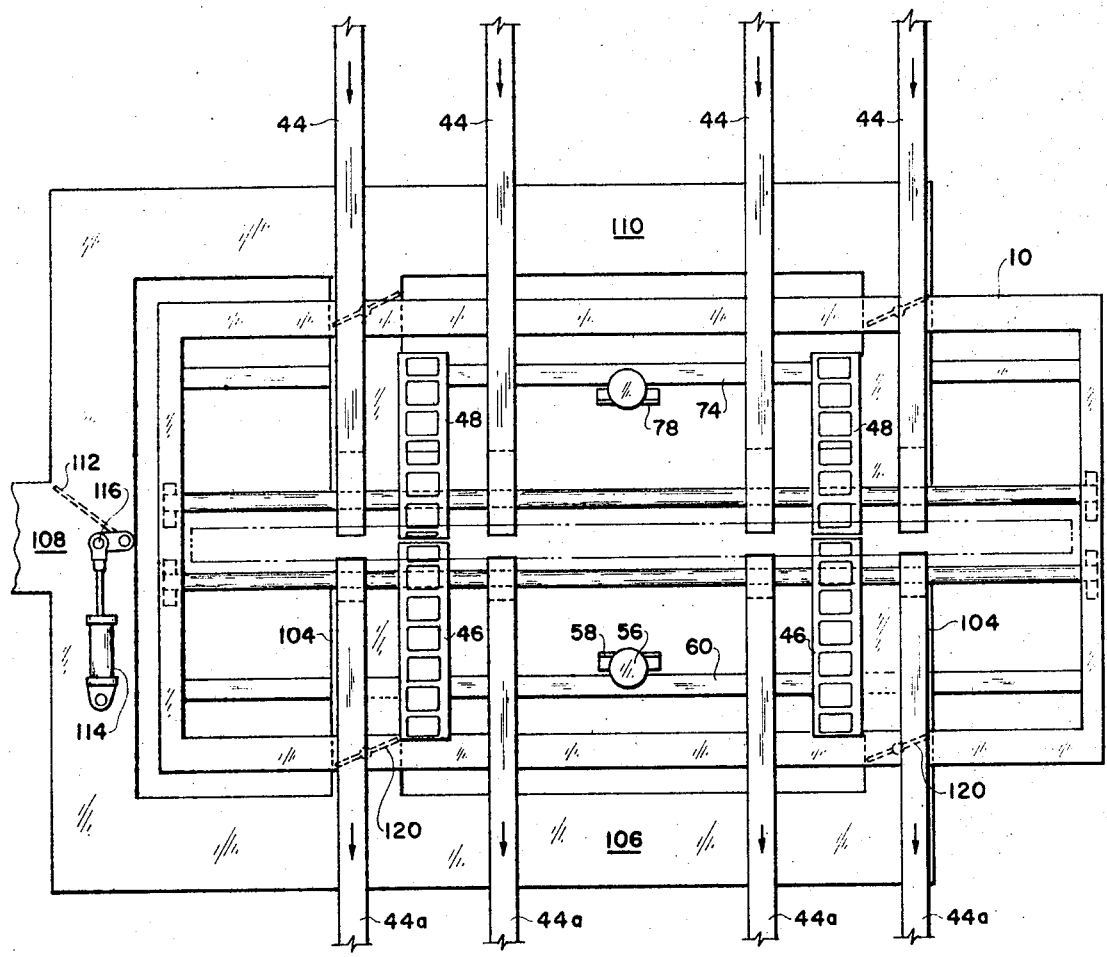
FIG. 5 is a top plan view of a strip veneer stacking bin with the top belts of the main conveyor removed for clarity.

Referring to FIGS. 4 and 5, the forward vacuum chambers 96 are connected to a source of vacuum by means of branch ducts 104, forward main duct 106, and source duct 108. The source duct is connected to a blower (not shown) which provides the requisite negative pressure. Rear vacuum chambers 98 are connected by similar branch ducts to rear main duct 110 which is also connected to the source duct 108.

Interposed between source duct 108 and main ducts 106 and 110 is pivotal gate valve 112 which is pivotally mounted at the juncture of ducts 106 and 110 within the duct structure and actuated through lever 116 by pneumatic cylinder 114. In a first position, as shown in FIG. 5, gate valve 112 opens the connection between forward main duct 106 and source duct 108 while cutting off connection between the source duct and rear main duct 110. In its second position valve 112 opens rear main duct 110 to source duct 108 while cutting off the connection between duct 108 and forward main duct 106. Pneumatic cylinder 114 is triggered to move valve 112 into its first position by the actuation of limit switch 82, and is triggered to move valve 112 into its second position by the actuation of limit switch 72, thus shifting the negative pressure or vacuum action back and forth between the forward and rear vacuum conveyors respectively for the purposes previously described.

Figure 7:
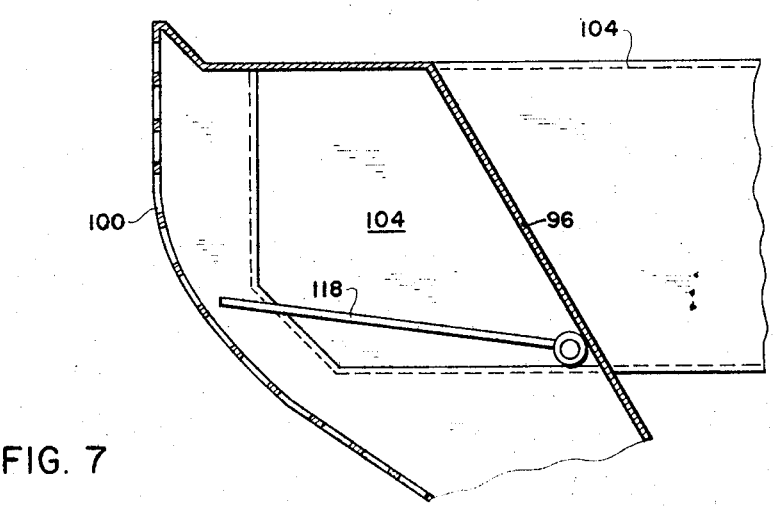
FIG. 7 is a partial sectional view of the vacuum chamber of one vacuum conveyor of a strip stacking bin taken along line 7—7 of FIG. 4.

Branch ducts 104 are connected to the various vacuum chambers 96 and 98 in the manner illustrated in FIG. 7 showing the connection of a branch duct 104 with one of the forward vacuum chambers 96. Duct 104 and chamber 96 are connected together in overlapping side-by-side relationship, the area defined by their overlapping portions being cut away and defining a passageway therebetween. The passageway is near the top of vacuum chamber 96 adjacent to that portion of the perforated surface of the vacuum chamber where the vacuum conveyor 46 curves forwardly and downwardly away from the top center of bin 12 toward forward aligning stop 60. An adjustable baffle 118 is pivotally mounted within vacuum chamber 96 near the bottom of and transverse to the aforementioned passageway. Baffle 118 traverses the entire cross section of forward vacuum chamber 96 when it is pivoted to its downward position, thereby substantially restricting the passage of air between the lower section of chamber 96 and the branch duct 104. At the same time the upper section of the chamber 96, whose perforated belt contacting surface includes the aforementioned curve diverging portion of conveyor 46, has unrestricted access to the high negative pressure present in branch duct 104. The result of this arrangement is that that portion of vacuum conveyor 46 which is in contact with the upper curved portion of perforated surface 100 will experience a high degree of air velocity and suction, whereas that portion of conveyor 46 which contacts the lower inclined portion of perforated surface 100 located below baffle 118 will experience relatively low air velocity and weak suction action. This disparity in the respective magnitudes of the suction action generated along the course of the vacuum conveyor is desirable for two reasons. First, the curved or diverging portion of the vacuum conveyor 46 near the top center of the bin requires that the veneer strips bend in order to follow the conveyor. Therefore a relatively high degree of suction is necessary to ensure that the strip will bend as desired and remain attached to the vacuum conveyor rather than falling off. Second, the lower inclined portion of the conveyor is the place where the kicker arms extend to separate the veneer strips from the conveyor. Since ease of separation is the object in this region, weak suction is desirable along this portion. To some extent the requisite differential in suction action can be effected by the respective spacing and numbers of the apertures provided in the perforated surface 100 of the vacuum chamber, but this division is fixed. The setting of baffle 118 is preferably adjusted empirically during operation of the apparatus to a position which provides the desired disparity in suction action between the two respective portions of the vacuum conveyor.

Branch ducts 104 are also equiped with vacuum balancing valves 120, as shown in FIG. 5, interposed between branch ducts 104 and their respective main duct. Balancing valves 120 are manually adjustable for the purpose of ensuring that the negative pressure imposed on one parallel belt of a vacuum conveyor is the same as that imposed on the other parallel belt of the conveyor.

Until now the description of the invention has proceeded primarily with respect to strip bin 12. It will be understood that the standard-width sheet bins 14 and 16 have only one vacuum conveyor each, 112 and 124 respectively, inclined downwardly and forwardly from the top of each bin toward their respective stack support members. No provision is made in the sheet bins for a rearwardly inclined conveyor such as 48 in the strip bin because bins 14 and 16 are each intended for stacking only veneer sheets having the same width as the stack being formed, and thus there is no need to apportion some sheets to the front and some to the rear of the stack to achieve uniform stack buildup. Conveyors 122 and 124 each have their own respective pairs of vacuum chambers 126 and 128 having perforated surfaces in contact with the apertured conveyor belts in the same manner as was described with respect to the forward vacuum conveyor of bin 12. Moreover each of the vacuum conveyors 122 and 124 of the sheet bins has associated with it forward transverse aligning stops, an aligning clamp, kicker arms, and limit switches substantially identical to those associated with forward vacuum conveyor 46 of the strip bin.

Figure 14:
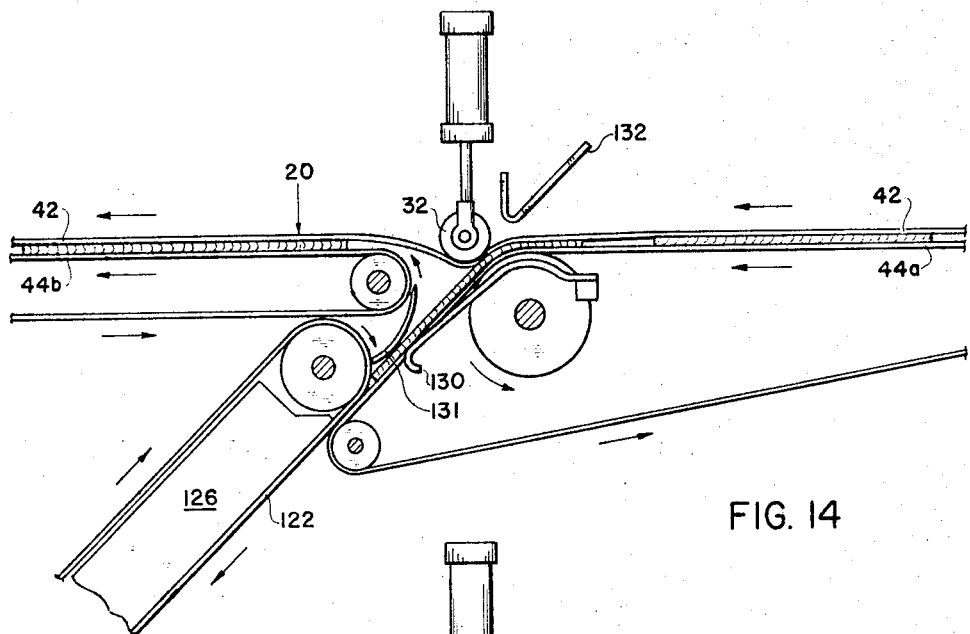
FIG. 14 is an enlarged side elevational partial view of the main conveyor, diverter roller, and top of the vacuum conveyor of a standard width sheet stacking bin showing the diverter roller in actuated position to divert a sheet of one standard width after a sheet of different standard width has passed by the diverter.
Figure 15:
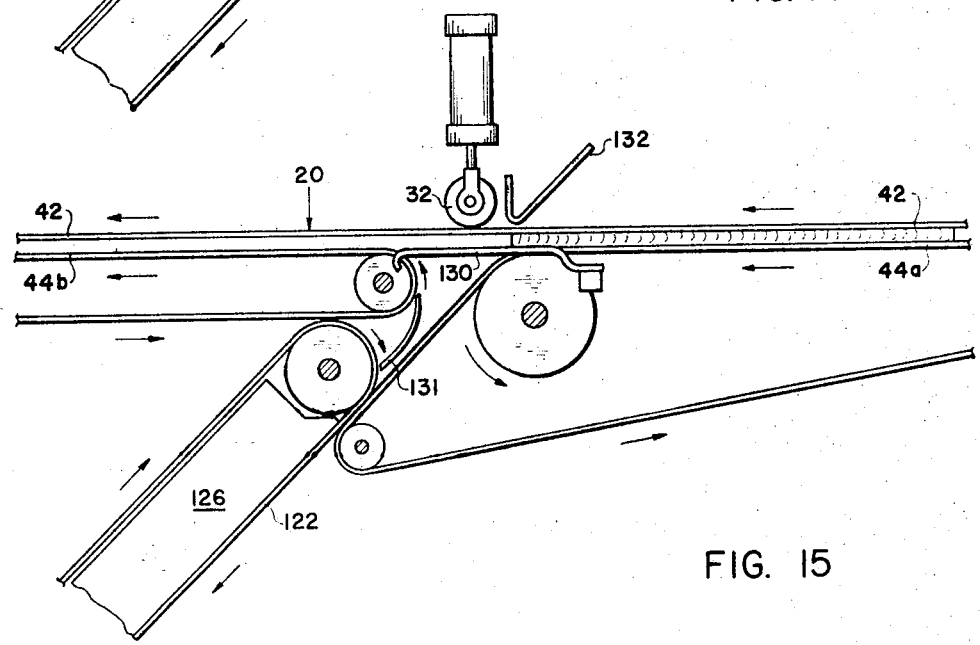
FIG. 15 is the same view as FIG. 14 except that the diverter roller is in non-actuated position.

If a sheet of veneer is of the standard width intended for stacking in bin 14, diverter roller 32, as best seen in FIG. 14, is triggered after suitable delay into its actuated, downwardly extended position by controller 26 in response to signals generated by width sensor 24, causing the leading edge of the sheet to bend downwardly between the two sets of bottom belts 44a and 44b of main conveyor 20. The sheet continues downwardly in response to the urging of main conveyor 20 guided by member 131 until it reaches vacuum conveyor 122 which then transports the sheet downwardly to the stack. Leaf springs 130 are arranged in parallel side-by-side relation with bottom belts 44a, 44b and function to ensure passage of a sheet over the gap between belts 44a and 44b when diverter roller 32 is not in diverting position, as in FIG. 15. A stationary guide 132 is positioned transversely to main conveyor 20 in advance of each diverter roller in order to push down and preposition any curled or ragged leading edges of the veneer sheets prior to their reaching the respective diverter rollers.

Figure 12:
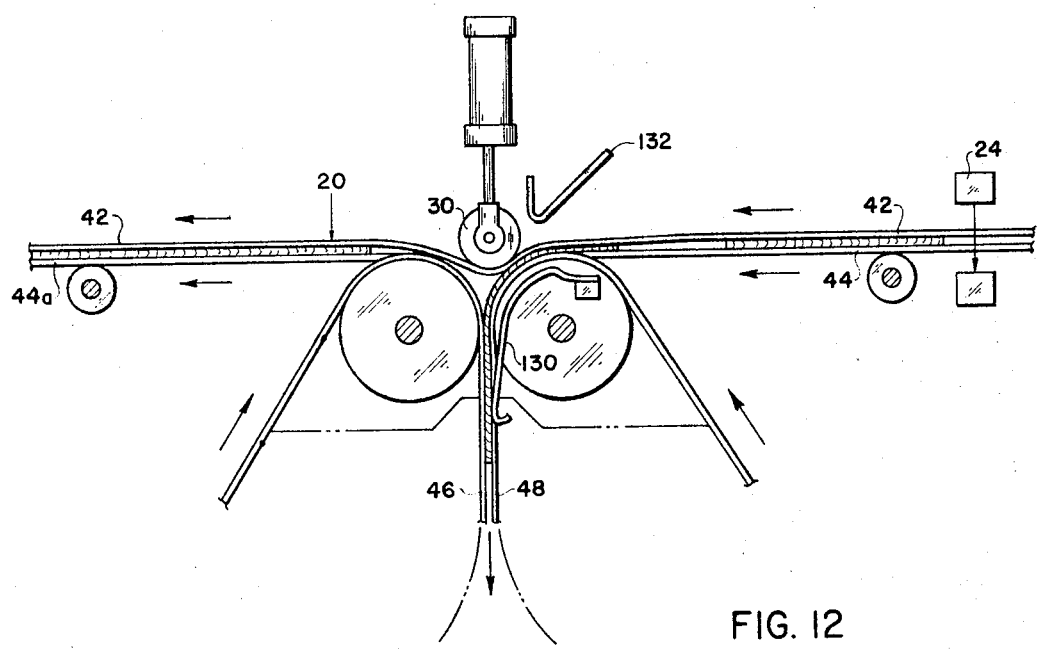
FIG. 12 is an enlarged side elevational partial view of the main conveyor, diverter roller, and tops of the vacuum conveyors of a strip stacking bin showing the diverter roller in actuated position to divert a strip.
Figure 13:
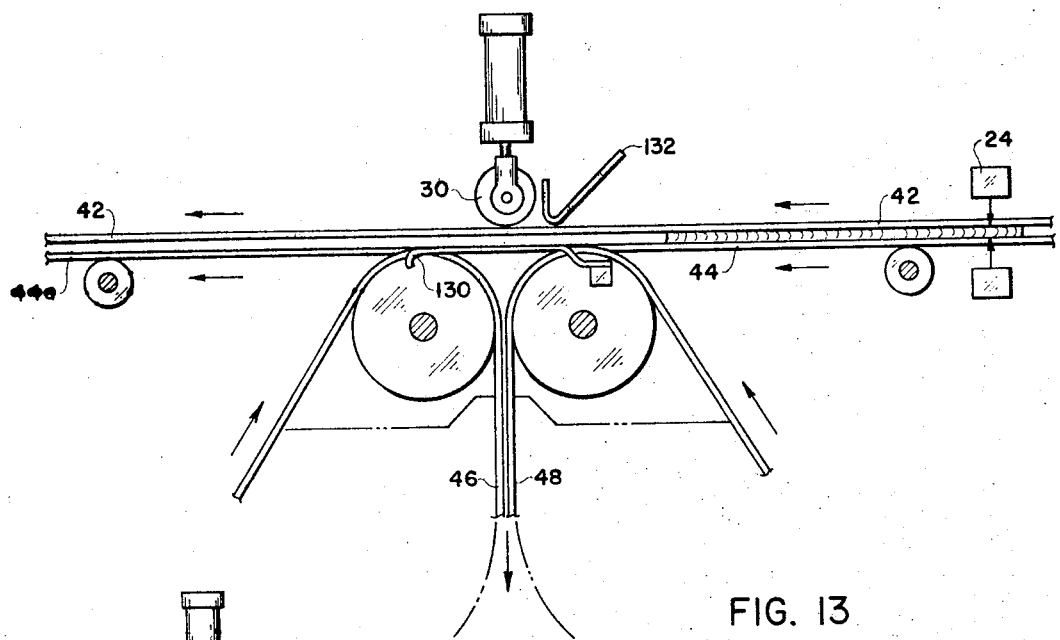
FIG. 13 is the same view as FIG. 12 except that the diverter roller is in non-actuated position to allow a standard width sheet to pass.

FIG. 12 shows a similar sequence of events when diverter roller 30 diverts a short-width strip of veneer into bin 12. FIG. 13 shows diverter roller 30 when it has been retracted by controller 26 in response to signals from width sensor 24 in order to allow a standard width sheet to pass by.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A veneer stacker for accepting transversely arranged veneer pieces from a horizontal main conveyor and stacking them in an orderly manner including a bin beneath said main conveyor having a stack supporting surface at its bottom, an aligning stop positioned transversely to the direction of travel of said main conveyor adjacent said stack supporting surface, means for directing said veneer pieces toward said aligning stop and clamp means mounted adjacent said aligning stop for seizing the leading edge of each said veneer piece upon its contact with said aligning stop to prevent its recoil from said stop, wherein the improvement comprises: clamp release sensor means coupled to said clamp means for releasing said clamp means in response to the passage of a respective veneer piece past a predetermined point prior to the time when said veneer piece contacts said aligning stop.

2. A veneer stacker for accepting transversely arranged veneer pieces from a horizontal main conveyor and stacking them in an orderly manner including a bin beneath said main conveyor having a stack supporting surface at its bottom, an aligning stop positioned transversely to the direction of travel of said main conveyor adjacent said stack supporting surface and a vacuum conveyor inclined downwardly from said main conveyor toward said aligning stop for supporting the respective pieces of veneer by their upper surfaces and transporting them downwardly toward said aligning stop, wherein the improvement comprises: a second aligning stop positioned transversely to the direction of travel of said main conveyor opposite to and facing said first aligning stop and a second vacuum conveyor inclined downwardly from said main conveyor toward said second aligning stop for transporting pieces of veneer downwardly toward said second aligning stop.

3. The veneer stacker of claim 2 wherein said first and second vacuum conveyors incline downwardly along opposite diverging paths from the top center of said bin toward said first and second aligning stops respectively.

4. The veneer stacker of claim 2 including vacuum switching means cooperating with said first and second vacuum conveyors for creating a greater vacuum with respect to one vacuum conveyor than the other, and for adjustably shifting said greater vacuum back and forth between said first and second vacuum conveyors, so that said veneer pieces are alternately attracted to and transported by the vacuum conveyor having the greater vacuum.

5. The veneer stacker of claim 2 including respective clamp means mounted adjacent each of said aligning stops for seizing the leading edge of each of said veneer piece upon its contact with a respective aligning stop.

6. The veneer stacker of claim 2 including means located adjacent each of said vacuum conveyors for separating each said veneer piece from a respective vacuum conveyor when said veneer piece has reached a predetermined point along the path of said vacuum conveyor.

7. A veneer stacker for accepting transversely arranged veneer pieces from a horizontal main conveyor and stacking them in an orderly manner including a bin beneath said main conveyor having a stack supporting surface at its bottom, an aligning stop positioned transversely to the direction of travel of said main conveyor adjacent said stack supporting surface and a vacuum conveyor inclined downwardly from said main conveyor toward said aligning stop for supporting the respective pieces of veneer by their upper surfaces and transporting them downwardly toward said aligning stop, wherein the improvement comprises: vacuum adjusting means associated with said vacuum conveyor for varying the degree of vacuum between the various portions of said vacuum conveyor's length so that one portion has greater vacuum than another portion.

8. The veneer stacker of claim 7 wherein said vacuum conveyor includes an upper portion curving downwardly from said main conveyor toward said aligning stop, and a lower straight portion inclined downwardly toward said aligning stop.

9. The veneer stacker of claim 7 including means for separating said respective veneer pieces from said vacuum conveyor located adjacent a portion of said vacuum conveyor having lesser vacuum than another portion.

10. A veneer stacker for accepting transversely arranged veneer pieces from a horizontal main conveyor and stacking them in an orderly manner including a bin beneath said main conveyor having a stack supporting surface at its bottom, an aligning stop positioned transversely to the direction of travel of said main conveyor adjacent said stack supporting surface and a vacuum conveyor inclined downwardly from said main conveyor toward said aligning stop for supporting the respective pieces of veneer by their upper surfaces and transporting them downwardly toward said aligning stop, wherein the improvement comprises: a plurality of spaced, parallel vacuum belts forming said vacuum conveyor, each connected to a source of vacuum, including vacuum balancing means for adjusting the relative levels of vacuum in each of said vacuum belts so as to equalize the vacuum among the respective belts.

11. A veneer stacker for accepting transversely arranged veneer strips of randomly varying width from a horizontal main conveyor and forming them into a stack having a width greater than that of the respective veneer strips of which it is composed comprising:

a. a bin beneath said main conveyor having a stack supporting surface at its bottom, and forward and rear transverse stack aligning stops at its forward and rear transverse sides respectively; and b. strip positioning means interposed between said main conveyor and said stack supporting surface for accepting said veneer strips from said main conveyor and transporting certain of said strips respectively toward transverse edge abutment with said forward aligning stop and others of said strips respectively toward transverse edge abutment with said rear aligning stop.

12. The veneer stacker of claim 11 wherein said strip positioning means includes diverter means for directing others of said strips respectively into a central position on said stack supporting surface between said forward and rear aligning stops and out of contact with either of said aligning stops.

13. The veneer stacker of claim 12 including veneer width sensor means, located along the path of said main conveyor and coupled to said diverter means, for measuring the width of the respective strips entering the bin, said diverter means being actuated in response to signals generated by said width sensor means to direct strips having less than a predetermined width into said central position on said stack supporting surface between said forward and rear aligning stops.

14. The veneer stacker of claim 12 including means located in said bin for sensing the height of strip buildup in the region of the stack between said forward and rear aligning stops and for inhibiting the actuation of said diverter means directing strips into said region when said buildup exceeds a predetermined limit.

15. The veneer stacker of claim 11 including forward stack height sensor means located adjacent said forward aligning stop and coupled to said strip positioning means for measuring the height of the forward transverse edge of the stack being formed and for actuating said strip positioning means to transport said strips toward abutment with said rearward aligning stop when the forward transverse edge of the stack reaches a predetermined height.

16. The veneer stacker of claim 15 including rear stack height sensor means located adjacent said rear aligning stop and coupled to said strip positioning means for measuring the height of the rear transverse edge of the stack being formed and for actuating said strip positioning means to transport said strips toward abutment with said forward aligning stop when the rear transverse edge of the stack reaches a predetermined height.

17. The veneer stacker of claim 16 including vertically movable lift means below the bottom of said bin for vertically positioning said stack supporting surface, one of said stack height sensor means being coupled to said lift means for actuating it downwardly in measured increments when the transverse edge of said stack which is monitored by said sensor means reaches a predetermined height.

18. The veneer stacker of claim 11 wherein said strip positioning means comprises a pair of vacuum conveyors inclined downwardly from the top of said bin, one toward said forward aligning stop and the other toward said rear aligning stop.

19. The veneer stacker of claim 18 wherein said strip positioning means includes vacuum switching means for creating a greater vacuum with respect to one of said vacuum conveyors than the other and for shifting said greater vacuum back and forth between said vacuum conveyors, so that said strips are alternately attracted to the vacuum conveyor having the greater vacuum.

20. A veneer sorter for selecting transversely arranged unsegregated veneer pieces of variable width and moisture content from a main conveyor and depositing them into a plurality of stacks segregated according to their width and moisture content comprising:
   a. a set of stacking bins located along the path of travel of said main conveyor for stacking veneer pieces of different predetermined width ranges, all of said pieces to have a moisture content within one predetermined moisture content range;
   b. respective diverter means located adjacent each said bin along the path of said main conveyor, each having a diverting position for guiding respective veneer pieces from said main conveyor into said respective bins according to width size and having a non-diverting position for allowing said respective veneer pieces to continue on said main conveyor traveling past said respective bins;
   c. veneer width sensor means, for measuring the width of each passing veneer piece, mounted along the path of said main conveyor in advance of said set of bins and coupled to said diverting means for causing the proper one of said diverter means, depending upon the width of the respective veneer piece, to be situated in its diverting position when said veneer piece approaches said diverter means; and
   d. veneer moisture detector means, for measuring the moisture content of each passing veneer piece, mounted along the path of said main conveyor in advance of said set of bins, said moisture detector means being coupled to said diverter means for causing each of said diverter means to be situated in its non-diverting position when approached by said veneer piece, regardless of its width, if its moisture content is outside of said predetermined moisture content range.

21. The veneer sorter of claim 20 including a second set of bins following said first set of bins along the path of travel of said main conveyor for segregating and stacking veneer pieces having a moisture content outside of said predetermined moisture content range acceptable for stacking in said first set of bins.

22. The veneer sorter of claim 21 wherein said second set of bins includes respective second diverter means similar to those associated with said first set of bins, and wherein second width sensor means mounted along the path of said main conveyor between said first and second sets of bins is coupled to said second diverter means for controlling the diversion of veneer pieces into the respective bins of said second set segregated according to width.

23. The veneer sorter of claim 20 wherein the first bin of said set of bins collects the shortest width pieces to be stacked in said set of bins.

24. The veneer sorter of claim 23 wherein said veneer width sensor means retains the diverter means of said first bin in diverting position at all times unless either a veneer piece of a width intended for one of the succeeding bins of said set, or a veneer piece having a moisture content outside said predetermined moisture contend range, approaches said first bin diverter means.

25. A veneer stacker which comprises:
   a. a table for horizontally supporting veneer pieces, said table having spaced outer support means for supporting the ends of said veneer pieces and central support means positioned between and above said outer support means for supporting the central portions of said veneer pieces at an elevation above said ends so as to permit said ends to arc downwardly; and
   b. means for depositing and orienting said veneer pieces on said table so that the ends of the respective pieces which are supported by said outer support means are those ends which are perpendicular to the grain of said veneer pieces.

26. The sorter of claim 25 wherein the outer and central support means of said table comprise an upwardly convex, arcuate supporting plate.

27. A veneer sorter for selecting transversely arranged unsegregated veneer pieces of variable width from a main conveyor and depositing them in a plurality of stacks segregated according to their width, including a set of stacking bins located along the path of travel of said main conveyor for stacking veneer pieces of different predetermined width ranges, respective diverters located adjacent each said bin and each having a diverting position for guiding respective veneer pieces from said main conveyor into a respective bin according to width size and having a non-diverting position for allowing said respective veneer pieces to continue on said main conveyor traveling past a respective bin, and veneer width sensor means, for measuring the width of each passing veneer piece, mounted along the path of said main conveyor and coupled to said diverters for causing a particular one of said diverters, depending upon the width of a respective veneer piece, to be situated in its diverting position when said veneer piece approaches said particular diverter, wherein the improvement comprises: means associated with said veneer width sensor means for causing at least one of said diverters to be retained normally in its diverting position during operation of said sorter unless a veneer piece of greater than a predetermined width approaches said diverter.

28. The veneer sorter of claim 27 wherein said diverter which is retained in diverting position is located adjacent the one of said set of bins in which are stacked the narrowest width pieces to be stacked in said set of bins.

29. The veneer sorter of claim 27 wherein said diverter which is retained in diverting position is located adjacent the one of said set of bins which precedes all of the other said bins along the path of travel of said main conveyor.

30. The veneer sorter of claim 27 wherein said veneer width sensor means includes means for causing a second one of said diverters to assume a diverting position only when a veneer piece within a width range greater than said predetermined width approaches said second diverter.

31. The veneer sorter of claim 30 wherein said second diverter follows said first diverter along the path of travel of said main conveyor.

32. A veneer sorter for sorting unsegregated pieces of veneer of variable characteristics and depositing them into a plurality of bins according to their respective characteristics, including a main conveyor comprising a pair of supporting conveyors positioned successively in end-to-end relation and separated at a point located at the top of one of said respective bins, and a reciprocating diverter roller having a diverting and non-diverting position mounted transversely to and above said pair of supporting conveyors at said point of separation between them for selectively diverting said veneer pieces into said bin, wherein the improvement comprises: an upwardly biased leaf-spring mounted in cantilevered fashion in side-by-side relation with said pair of supporting conveyors traversing said point of separation between them for preventing the diversion of said respective veneer pieces into said bin when said diverter roller is in its non-diverting position.

33. A veneer sorter for sorting unsegregated pieces of veneer of variable characteristics and depositing them into a plurality of bins according to their respective characteristics, including a main conveyor comprising a pair of supporting conveyors positioned successively in end-to-end relation and separated at a point located at the top of one of said respective bins, and a reciprocating diverter roller having a diverting and non-diverting position mounted transversely to and above said pair of supporting conveyors at said point of separation for selectively diverting said veneer pieces into said bin, said main conveyor having a transversely spaced plurality of top belts overlying said pair of supporting conveyors for sandwiching veneer pieces between said top belts and said supporting conveyors, wherein the improvement comprises: guide means mounted above said main conveyor in advance of said diverter roller for urging the leading edge of said respective veneer pieces toward said supporting conveyors prior to their reaching said point of separation between said pair of supporting conveyors.

* * * * *